Dec. 7, 1943.　　　O. L. ALTENBERG　　　2,335,893
ARTIFICIAL HORIZON FOR OPTICAL INSTRUMENTS
Filed July 11, 1942　　2 Sheets-Sheet 1

Inventor
Orville L Altenberg
By Clarence A O'Brien
and Harvey B. Jacobson Attorneys Dec. 7, 1943.         O. L. ALTENBERG                2,335,893
          ARTIFICIAL HORIZON FOR OPTICAL INSTRUMENTS
                    Filed July 11, 1942        2 Sheets-Sheet 2
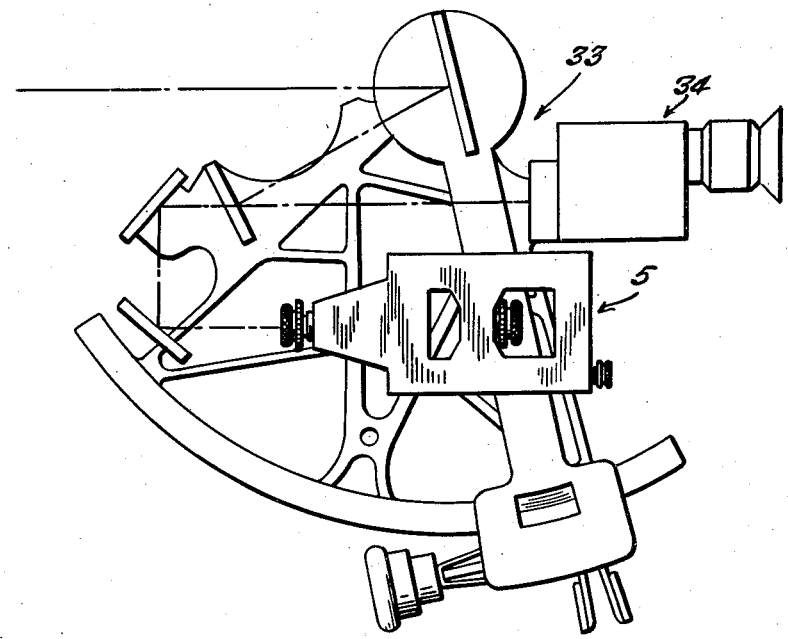
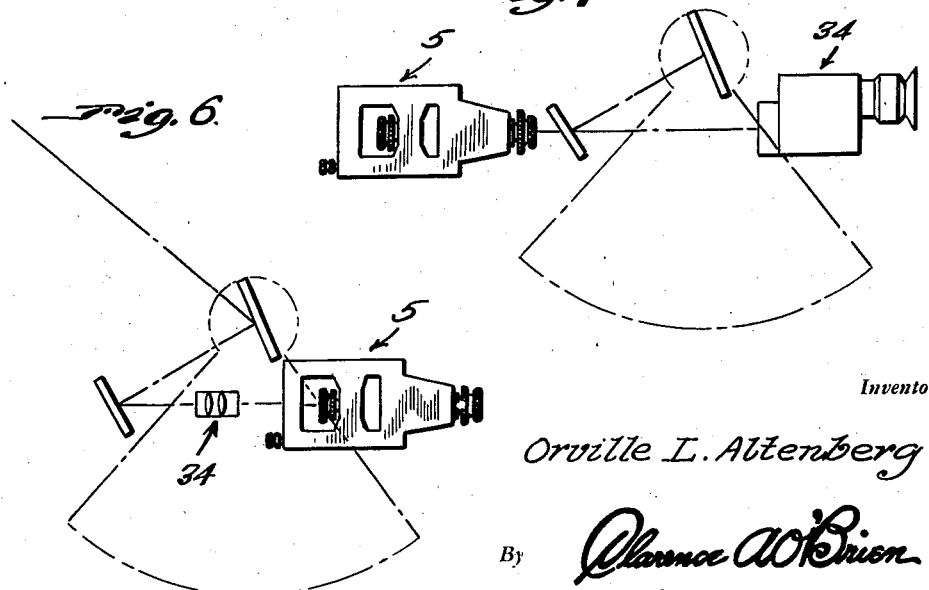
Inventor
Orville L. Altenberg
By Clarence A. O'Brien
and Harvey B. Jacobson  Attorneys Patented Dec. 7, 1943

2,335,893

UNITED STATES PATENT OFFICE 2,335,893

ARTIFICIAL HORIZON FOR OPTICAL INSTRUMENTS

Orville L. Altenberg, Toledo, Ohio

Application July 11, 1942, Serial No. 450,589

3 Claims. (Cl. 88—2.2)

The invention relates to an improved artificial horizon for optical instruments wherein a true level is required and for use for such instruments as engineers' and architects' levels, transits and sextants, and the primary object of the invention is to provide a more accurate and more usable device of this character which can be mounted on the sextant or like instrument in a variety of positions.

Other important objects and advantages of the invention will be apparent from a reading of the following description taken in connection with the appended drawings, wherein for purposes of illustration a preferred embodiment of the invention is shown.

In the drawings—

Figure 5 is a side elevational view of a sextant showing a permissive mounting of the artificial horizon thereon.

Figure 6 is a view similar to Figure 5, partly in diagrammatic form to illustrate another permissive mounting of the artificial horizon on a sextant.

Figure 7 is a view similar to Figure 6 showing a still further permissive mounting of the artificial horizon on a sextant.

Referring in detail to the drawings, the artificial horizon which is generally designated by the numeral 5 consists of a longitudinally and vertically elongated relatively narrow generally rectangular housing consisting of a block of plastic or other suitable material to favor light weight and properly contain the mercury or other suitable level fluid. The block is formed internally adjacent the ends thereof with similar and parallel vertical bores 6 and 7. The upper ends of the bores are connected by a horizontal upper bore 8, and the lower ends of the vertical bores 6 and 7 are connected with the opposite ends of a lower horizontal bore 9 which is substantially parallel to the upper horizontal bore 8 and which is slightly larger in cross section and diameter than the upper horizontal bore 8, the lower bore 9 constituting a level fluid reservoir having communication with both of the vertical bores 6 and 7.

Figure 1:
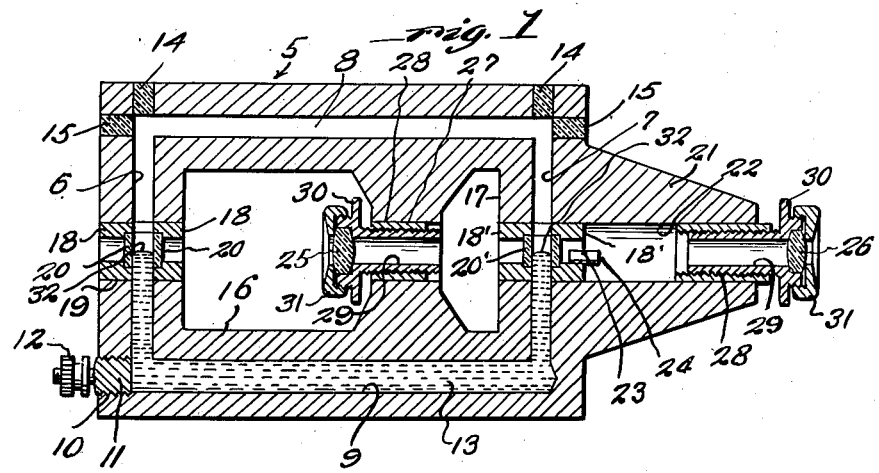
Figure 1 is a general vertical longitudinal sectional view taken through the artificial horizon.
Figure 2:
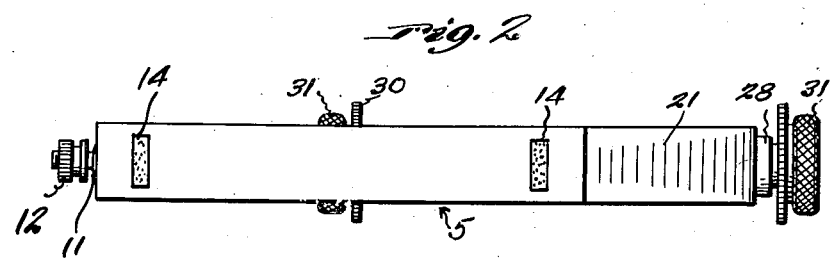
Figure 2 is a top plan view of Figure 1.
Figure 3:
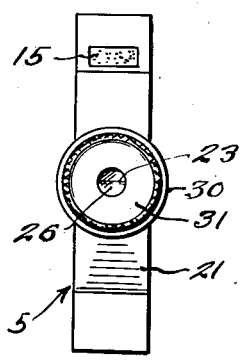
Figure 3 is a right hand end elevational view of Figure 1.
Figure 4:
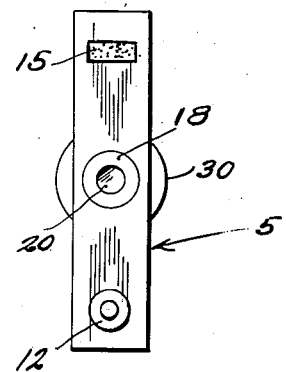
Figure 4 is a left hand end elevational view of Figure 1.

As indicated in Figure 1 of the drawings, the left hand end of the first bore 8 has an internally threaded extension 10 opening through the left hand end of the block, in which is threaded a plug 11 on the outer end of which is a handle 12 enabling adjusting the plug inwardly or outwardly to provide for raising or lowering the columns of the level fluid in the vertical bores 6 and 7, the reservoir 9 and the lower portions of the vertical bores 6 and 7 being filled with the level fluid 13, such as mercury or other suitable fluid. Glass or other translucent material windows 14 are placed in vertical alignment above the upper ends of the vertical bores 6 and 7 as indicated in Figure 1 of the drawings, and other similar windows 15 are placed in the end walls of the block in horizontal alignment with the upper bore 8, the purpose of the windows being to provide sufficient light for viewing the menisci naturally produced on the upper ends of the columns of fluid in the bores 6 and 7.

The block is cut through from a point adjacent its longitudinal middle to a point adjacent its left hand end, as indicated in Figure 1 of the drawings to provide a relatively large void 16 within the block. Another smaller chamber or space 17 is formed entirely through the block in longitudinally spaced relation to the chamber 16 and in longitudinally spaced relation to the adjacent end of the block, also to provide a void smaller than the void provided by the chamber 16.

Axially aligned pairs of tubular bushings 18 extend horizontally in a bore 19 extending from the left hand end of the block into the chamber 16, with glass or other suitable translucent material windows 20 inset in the facing ends of the bushings 18 flush with these ends and flush with the walls of the vertical bore 6. The windows 20 should be relatively transparent. Similar bushings 18' and glasses or other transparencies as lenses 25 are similarly arranged in the opposite end of the block with respect to the vertical bore 7, the bushings 18' and the windows 20' being axially aligned with the bushings 18 and windows 20.

The right hand end of the block is formed with a tapering extension 21 which is formed with a longitudinal bore 22 in the inner end portion of which the right hand bushing 18' is inserted. A collimation line is provided by a wire 23 strung between the arms of a U-shaped support 24 mounted in the right hand end of the bore of the bushing 18', to occupy a proper position in substantial coincidence with the axis of the spherical lenses 25 and 26.

A horizontal bore 27 provided in the block and opening into the chambers 16 and 17 as shown in Figure 1 of the drawings has inserted therein a stationary tube 28 which is internally threaded and into which is threaded the tube 29 on the spherical lens mounting 30 which includes the threaded ring 31 holding the spherical lens 25 in place in the right hand end portion of the chamber 16. A similar mounting is provided for the positioning of the spherical lens 26 at the right hand end of the tapered extension 21, the tube 28 of this lens mounting being inserted in the right hand end of the bore 22 of the said extension. The lenses 25 and 26 are adjustable toward and away from each other in an obvious and conventional manner.

When a proper amount of mercury or similar level fluid 13 is in the reservoir 9 the same will rise in the vertical bores 6 and 7 to provide columns having menisci 32 at their upper ends which are to be leveled with respect to the collimation line 23 by tilting the artificial horizon 5 either to the left or to the right from an other than absolutely level position. If in the level position of the block the menisci 32 of the columns rise above or are depressed below the axis of the spherical lenses 25 and collimation line 23, the columns may be raised or depressed by adjustment of the plug 11 in an obvious manner, to bring about coincidence.

Suitable adjusting means (not shown) may be easily devised to mount the artificial horizon 5 in different positions on and in different locations relative to a sextant such as below, on a level with, and before or behind the sextant telescope 34 as variously illustrated in Figures 5, 6 and 7 of the drawings, suitable mirror means being provided in each instance to transmit the image of the celestial body observed into said telescope and into the artificial horizon 5, horizon glasses being utilized in each instance.

The spherical lenses 25 and 26 are so arranged that their foci and manner of separation produce an erect image of one object viewed and an inverted image of another object viewed, when these objects are located at predetermined points with respect to the optical system comprising said spherical lenses. The inversion of the image of one object and the erection of the image of the other object, are used in the present device to provide an artificial horizon, consisting in this instance of the menisci of the two level fluid columns 32 which rise from a common reservoir. Since the two menisci of the columns are constantly at a true level, with alignment of the menisci with the axes of the axially aligned spherical lenses 25 and 26, the images of the two menisci are presented into the optical field of a sextant telescope, apparently in the same plane, with one image being erect and the other image inverted, and with an aperture between the images of as small a size as the operator may choose.

If the menisci of the fluid columns are depressed below the center of the optical system the images will appear to be greatly separated. If the menisci are positioned higher than the optical center of the lens system, then the image of only the front column is visible. If the block be forwardly down tilted with respect to the horizontal, the forward column rises above the optical center of the lenses, while the rear column drops below the optical center, so that only the forward column is visible. When tilted in the opposite direction only the rear column is visible. However, when the block is level, the collimating line 23 will be seen as tangent to the erect and inverted images of the two menisci.

The described arrangement with the objects placed so that one is on the optical axis and beyond the lenses and the object on the optical axis and located between the two lenses, provides for rays of light from the rearward column menisci being acted on first by the rear lens 26 which presents them into the front lens 25 as an inverted image, and rays of light from the forward column are acted on by the lens of the forward lens 25 only and are presented as an erect image of the menisci of the corresponding columns.

Although there is shown and described a preferred embodiment of the invention it is to be definitely understood that it is not desired to limit the application of the invention thereto, except as may be required by the scope of the subjoined claims.

Having described the invention, what is claimed as new is:

1. An artificial horizon for mounting on a sextant having a telescope, said artificial horizon comprising a support, a horizontal reservoir on said support, said reservoir being open at one end, an adjustable plug closing the open end of the reservoir, a pair of vertical conduits rising from and communicating with said reservoir, said vertical conduits being substantially spaced along the reservoir, a horizontal conduit connecting the upper ends of said vertical bores, a sufficient quantity of level fluid in said reservoir to provide columns rising in said vertical conduits, said columns having menisci on their upper ends, axially aligned windows in said vertical conduits through which the menisci can be viewed with said support in a substantially level horizontal position, a first spherical lens mounted on said support between said windows, a second spherical lens mounted on said support at the outer side of one of said windows, said spherical lenses being axially aligned, and a fixed collimation line mounted on said support between the second lens and the adjacent window in axial alignment with the lens, said plug being adjustable to elevate or depress the menisci of the columns into coincidence with the collimation line, the support being level.

2. An artificial horizon according to claim 1 wherein said support comprises a substantially solid block and said reservoir, vertical conduits, and said horizontal conduit consisting of bores formed internally in the block.

3. The combination with a sextant having an horizon glass and a telescope, of an artificial horizon according to claim 1, wherein means is provided for mounting the artificial horizon on a portion of the sextant in effective relation to said horizon glass and the telescope.

ORVILLE L. ALTENBERG.